Patented May 22, 1934

1,959,590

UNITED STATES PATENT OFFICE 1,959,590

FATTY ACID ESTERS OF CARBOHYDRATES AND METHOD FOR PRODUCING

Eugene J. Lorand, Wilmington, Del., assignor to Hercules Powder Company, Wilmington, Del., a corporation of Delaware No Drawing. Application March 22, 1932, Serial No. 600,569

7 Claims. (Cl. 260—101)

This invention relates to an improvement in esters and method for their production and more particularly relates to higher fatty acid esters of carbohydrates from the group starch, dextrins and sugars.

Heretofore it has been known to esterify carbohydrates, as starch, by treatment with a chloride of a higher fatty acid, as an acid containing more than eight carbon atoms, in the presence of a cyclic tertiary amine, as pyridine, but such method is substantially unsatisfactory due to the fact that the recovery of excess acid chloride and of the tertiary amine is difficult and expensive.

Now, in accordance with this invention there is provided a simple and economic method for the esterification of carbohydrates from the group starch, dextrins and sugars, with the production of esters having novel and valuable characteristics, which involves treatment of a carbohydrate from the group specified with a simple anhydride of a higher fatty acid, as an acid containing more than eight carbon atoms, alone, or with mixed anhydrides of higher fatty acids, or of higher and lower fatty acids, or with a mixture of anhydrides of higher fatty acids, or mixtures of anhydrides of higher and lower fatty acids, likewise mixtures of simple and mixed anhydrides may be used. In the treatment a suitable catalyst will be used and the carbohydrate, and more particularly starch and dextrine, which have a solid, non-crystalline structure, as compared with the crystalline structure of the sugars, desirably will be pretreated in any suitable manner to swell it, thus permitting permeation of the esterifying agent.

In carrying this invention into practice there may be used as the esterifying agent such anhydrides, mixed anhydrides and mixtures of anhydrides, as for example, palmitic anhydride, acetic-stearic anhydrides, acetic-lauric anhydride, palmitic-stearic anhydride, oleic-myristic anhydride, linoleic anhydride, acetic-palmitic anhydride and ricinoleic anhydride and anhydride of whale oil. Likewise, mixtures of anhydrides and of mixed anhydrides derived from acids such as may be obtained by the hydrolysis of fats and oils, as, for example, such as are obtained by the treatment of, for example, coconut oil or whale oil with caustic soda solution for the formation of a soap, decomposing the soap with sulphuric acid to obtain a mixture of fatty acids, heating the fatty acids with acetic anhydride and distilling off the acetic acid formed.

It will be noted that when a mixed anhydride is used as the esterifying agent it need not be added as such, but may be formed in situ by the use of an acid anhydride and an acid as, for example, acetic anhydride and palmitic acid in place of acetic-palmitic anhydride.

Any suitable catalyst may be used, as, for example, sulfuryl chloride, magnesium perchlorate, etc.

Where, as in the case more particularly of starch and dextrins, a swelling of the carbohydrate prior to the esterification treatment is desirable, such may be accomplished through any suitable pretreatment of the carbohydrate, the purpose of the swelling being essentially to put the carbohydrate in a physical condition in which its esterification will be facilitated. Thus, the swelling of starch and dextrins may be accomplished, for example, by pretreatment involving heating in fused monochloracetic acid.

In the production of esters by the treatment of starch, the starch will be swelled, as for example, by treatment with fused monochloracetic acid and the esterifying mixture added after the starch has swelled.

As more specifically illustrative of the practical adaptation of this invention, for example, an ester embodying this invention may be produced by introducing, with agitation, say 20 g. of potato starch, after careful drying at say 50° C., into 200 g. to 250 g. of fused monochloracetic acid and raising the temperature to say 82° C. at which temperature the starch will swell. After the starch has desirably swelled 280 g. of palmitic anhydride and 2 g. of sulfuryl chloride are added. The mixture will turn dark red and after heating at a temperature of say 90° C. for about one-half hour the viscosity will drop and the reaction will be completed.

For separation of the ester produced, the reaction mixture is poured in one-half gallon of alcohol and the ester filtered off. The ester will be soft and doughy and will be repeatedly boiled in methanol and decanted. Further purification may be effected by dissolving the product in benzene and precipitating with alcohol. The ester will be hardened so that it may be ground by permitting it to stand in alcohol or methanol. The yield from procedure in accordance with the above illustration will amount to about 70 g.

As a further illustration, say 18 g. of sucrose are introduced into 200 g. of monochloracetic acid at a temperature of 60°–70° C., then 240 g. of palmytic anhydride and 0.5 g. of magnesium perchlorate are added and the temperature raised to 90° C. with stirring. The reaction will be completed in 3-4 hours and the crude ester may be recovered as described in connection with the previous example. As has been indicated, the pretreatment of the sucrose with monochloracetic acid may, if desired, be omitted. The crude ester may be purified, for example, by dissolving in ligroin, filtering and pouring into alcohol externally cooled with ice to effect precipitation.

As a further illustration, for example, 20 g. of potato starch dried at about 50° C. is stirred into a fusion of 160 g. of monochloracetic acid at a temperature of about 82° C. After the starch is swelled 160 g. of acetic-stearic anhydride and 2 g. of sulfuryl chloride are added and the heating continued with stirring for about 2-5 hours, or until the viscosity of the dark colored mixture is slightly reduced. The ester produced may be separated by precipitation and filtering and may be purified by dissolving in benzene and precipitating with alcohol from the solution.

As a still further illustration, for example, esterification of starch, dextrins and sugars may be effected following the procedure of the above examples with the use of an anhydride mixture produced, for example, by stirring 215 g. of coconut oil with about an equal amount of a 5% sodium hydroxide solution, then adding a solution of 40 g. sodium hydroxide in 40 g. of water and stirring at a temperature of about 40° C. To the mass, after standing for a few hours, 500 cc. of water are added and the soap decomposed with sulphuric acid. The fatty acids obtained by the decomposition are washed several times with hot water, xylol added and distilled in vacuo to remove dispersed water. To about 155 g. of the fatty acids obtained there is added about 80 cc. acetic anhydride and the mixture refluxed in a bath at about 160° C. for 2-3 hours. Finally the acetic acid formed is distilled off in vacuo while raising the bath temperature gradually to about 200° C. The resultant anhydride mixture is then ready for use and may be used, for example, for the esterification of potato starch by adding 290 g. of the mixture and 2 g. sulfuryl chloride to 20 g. of potato starch swelled by treatment with 300 g. of monochloracetic anhydride at 80° C. The reaction may be carried out at 80-85° C. with stirring and will be completed in 3-4 hours. The ester produced may be separated by precipitation with alcohol and filtering and may be purified by, for example, dissolving in benzene and precipitating with alcohol.

The esters in accordance with this invention will be found to be soluble in various organic solvents, as, for example, benzene and its homologs, chloroform, acetylene tetrachloride, and other chlorinated solvents, cyclohexanone, ethyl, butyl, amyl acetates, acetone, etc., and to lend themselves variously to use in the commercial arts, as in films, filaments, protective coatings, etc., etc. Further, the several esters will be found to have a strong water repellent action, which makes them suitable for waterproofing paper, regenerated cellulose, textiles, etc.

What I claim and desire to protect by Letters Patent is:

1. The method of producing an ester of a carbohydrate from the group starch, dextrins and sugars, which includes heating the carbohydrate with a higher fatty acid anhydride in the presence of an esterification catalyst.

2. The method of producing an ester of a carbohydrate from the group starch, dextrins and sugars, which includes heating the carbohydrate with a mixture of higher fatty acid anhydrides in the presence of an esterification catalyst.

3. The method of producing an ester of a carbohydrate from the group starch, dextrins and sugars, which includes heating the carbohydrate with a mixture of higher and lower fatty acid anhydrides in the presence of an esterification catalyst.

4. The method of producing an ester of a carbohydrate from the group starch, dextrins and sugars, which includes heating the carbohydrate with mixed fatty acid anhydrides in the presence of an esterification catalyst.

5. The method of producing an ester of a carbohydrate from the group starch, dextrins and sugars, which includes heating the carbohydrate with fatty acid anhydrides derived from fats and oils in the presence of an esterification catalyst.

6. The method of producing an ester of a carbohydrate from the group starch and dextrins, which includes swelling the carbohydrate and then heating the carbohydrate with a higher fatty acid anhydride in the presence of an esterification catalyst.

7. The method of producing an ester of a carbohydrate from the group starch and dextrins, which includes heating the carbohydrate with monochloracetic acid and then heating the carbohydrate with a higher fatty acid anhydride in the presence of an esterification catalyst.

EUGENE J. LORAND.